United States Patent [19]

Kaufman

[11] Patent Number: 4,595,300
[45] Date of Patent: Jun. 17, 1986

[54] THERMOCOUPLE DRIVE ASSEMBLY
[75] Inventor: William E. Kaufman, West Deptford, N.J.
[73] Assignee: Mobil Oil Corporation, New York, N.Y.
[21] Appl. No.: 642,325
[22] Filed: Aug. 20, 1984
[51] Int. Cl.$^4$ ............................................ G01K 13/00
[52] U.S. Cl. ..................................... 374/170; 318/450; 374/141
[58] Field of Search .................... 374/179, 140, 139
[56] References Cited
U.S. PATENT DOCUMENTS 2,971,041  2/1961  France ............................ 374/140 X
3,390,578  7/1968  Moore ............................. 374/179 X
3,610,601  10/1971  Bishop, Jr. ..................... 374/140 X
4,118,986  10/1978  Werner et al. ................... 374/179 X Primary Examiner—Daniel M. Yasich
Attorney, Agent, or Firm—Alexander J. McKillop; Michael G. Gilman; Charles J. Speciale

[57] ABSTRACT

An assembly for driving a thermocouple into a thermocouple well includes two pinch wheels biased to grip the thermocouple probe between them. The pinch wheels are located adjacent to the thermocouple well. A reel of supporting cable is positioned remote from the well. A free end of the cable on the reel is connected to the thermocouple probe so that as the probe is driven into and out of the well, the cable is unwound and wound onto the reel.

6 Claims, 7 Drawing Figures

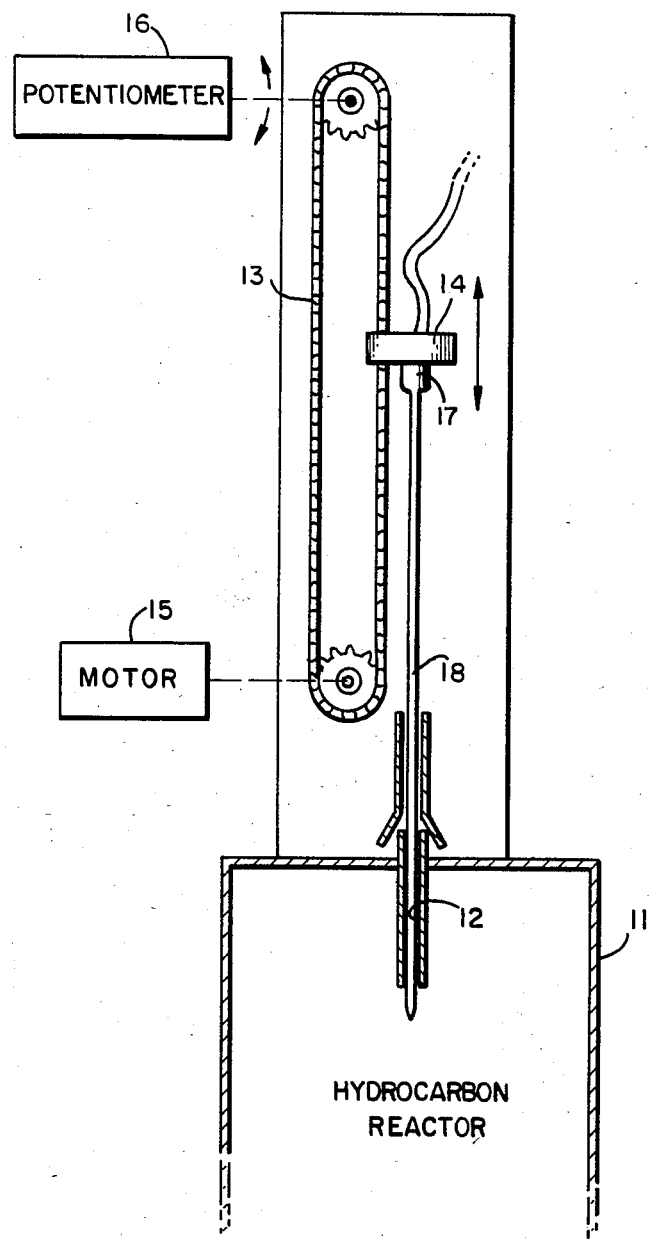
FIG. IA
PRIOR ART

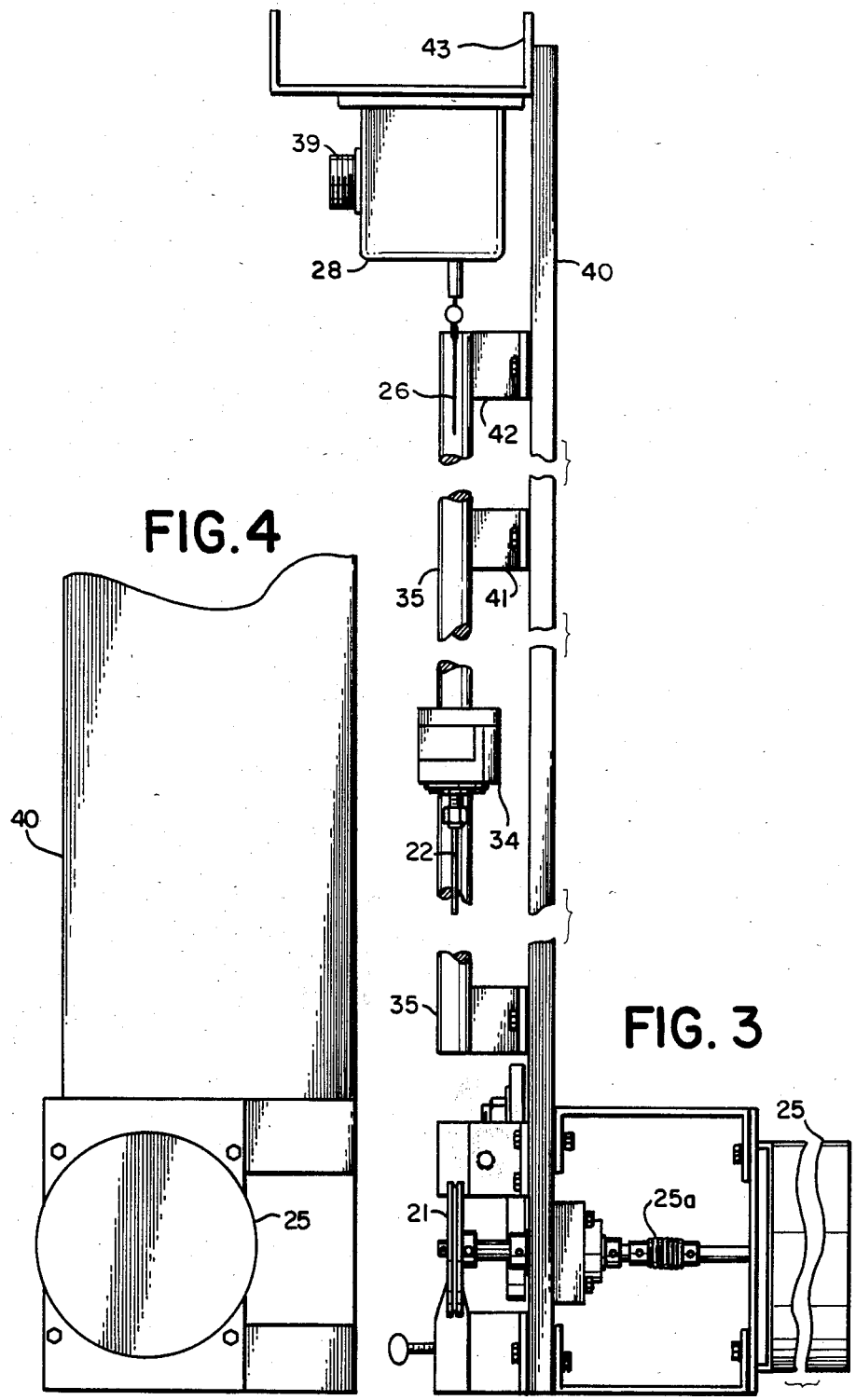

THERMOCOUPLE DRIVE ASSEMBLY

BACKGROUND OF THE INVENTION

The present invention relates to a thermocouple drive assembly and more particularly, to a thermocouple drive which will position a thermocouple in a well in a hydrocarbon reactor without binding or breaking the thermocouple wire.

Catalytic reactors are extensively used in hydrocarbon processing. In the operation of these units it is desirable to make periodic measurements of temperature at a series of spaced locations in the reactor. Temperature measurements inside a reactor are commonly made by moving a thermocouple to different specific locations inside a thermowell mounted within the reactor. Motor driven thermocouple probe drives, frequently computer controlled, are used. However, thermocouples being generally long and thin have a decided tendency to bend, thus being rendered useless, when being pushed into a small opening such as a thermowell inlet.

It is an object of the present invention to obviate the foregoing problem by gripping and driving the thermocouple very close to the opening of the thermowell.

SUMMARY OF THE INVENTION

In accordance with the invention, the thermocouple probe is driven by a pinch wheel mechanism located closely adjacent to the opening in the thermocouple well. The thermocouple probe is attached at one end to a cable extending from a reel located remote from the thermocouple well. As the drive mechanism drives one end of the thermocouple probe into and out of the thermocouple well, the cable on the reel is unwound and wound onto the reel. Instead of pushing a thermocouple of 1/16" outside diameter at a distance of 15 to 60" for example, from the thermocouple well opening, the drive of the present invention grips and drives the thermocouple probe about ½" from the opening of the guide to the well. The chances of a thermocouple probe bending within the ½" distance are remote compared to the 15" or longer distance required for driving the thermocouple probe in prior art drives. The drive of the present invention greatly prolongs the useful life of thermocouples.

The thermocouple drive of the present invention is used in a computer controlled system wherein the position of the probe is accurately controlled and sensed by a digital computer. The computer controls the recording of temperature measurements at periodic intervals at different locations in the reactor.

SHORT DESCRIPTION OF THE DRAWINGS

FIG. 1A shows the prior art thermocouple drive assembly on which the present invention is an improvement;

FIG. 3 is a side view of the assembly;

FIG. 4 is a rear view of the assembly;

DESCRIPTION OF THE PREFERRED EMBODIMENT

Figure 1:
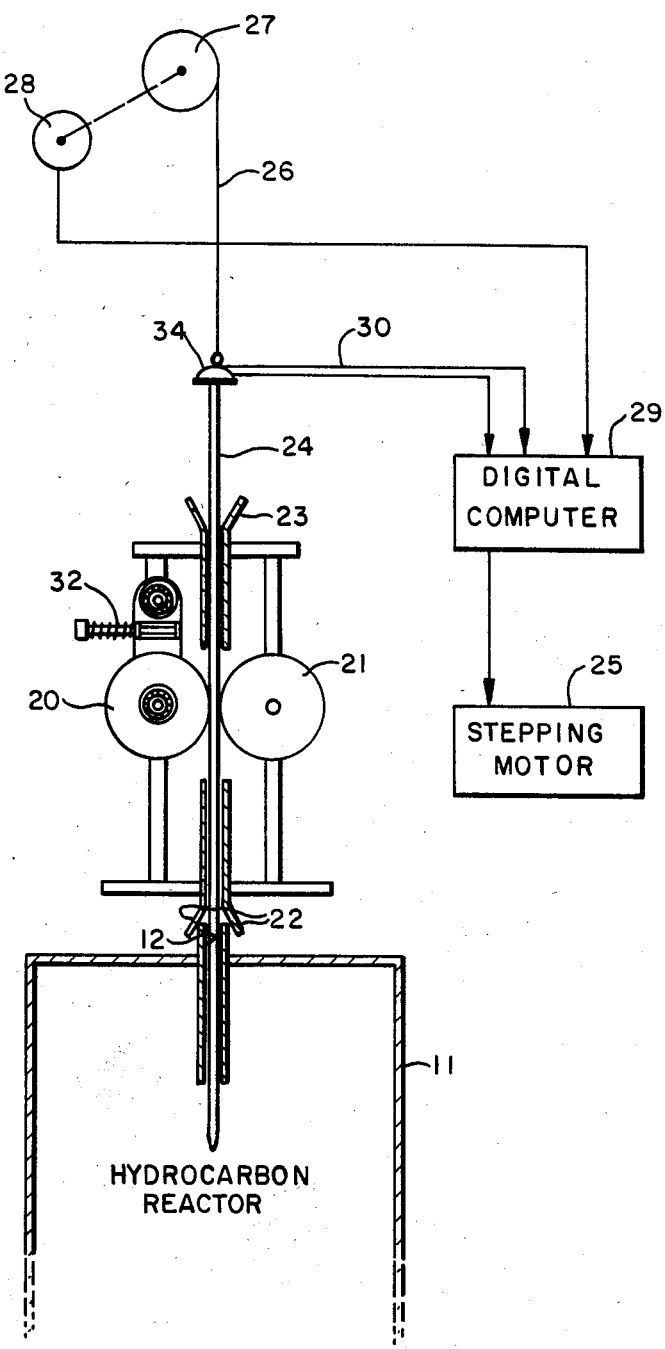
FIG. 1 depicts the thermocouple drive of the present invention.
Figure 2:
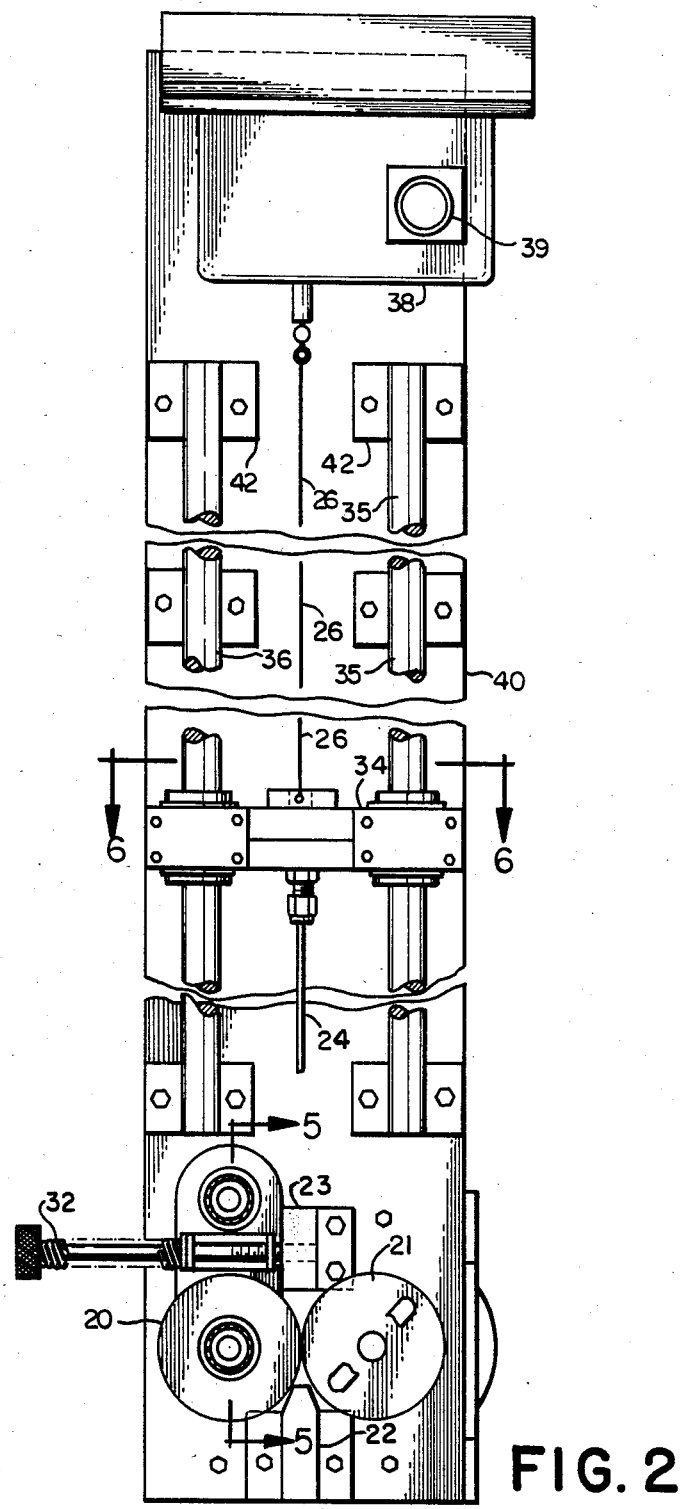
FIG. 2 is a front view of the drive assembly.
Figure 5:
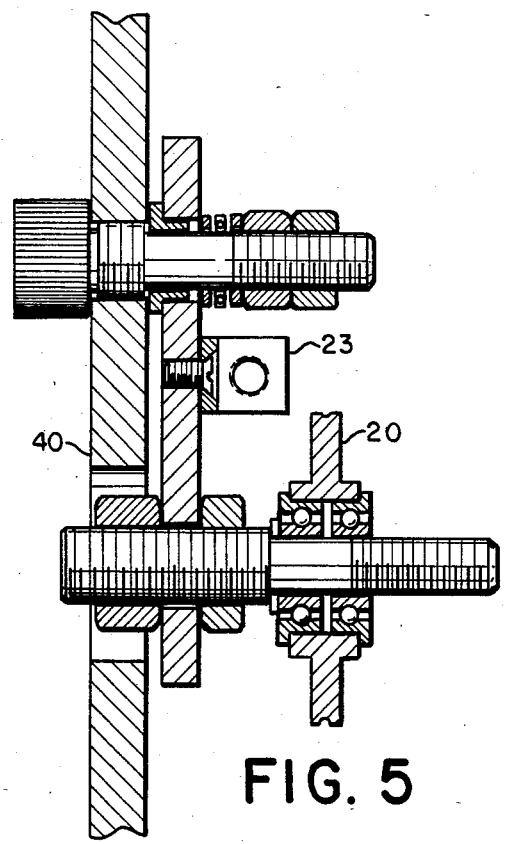
FIG. 5 is a section on the line 5—5 of FIG. 2.
Figure 6:
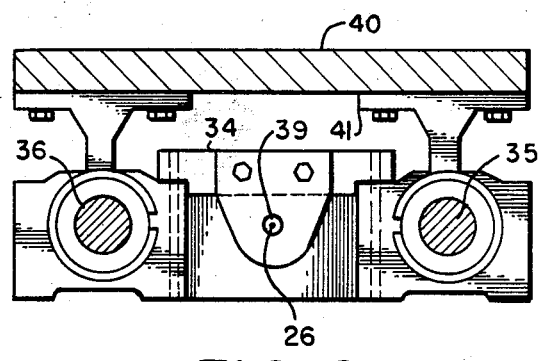
FIG. 6 is a view of the line 6—6 of FIG. 2.

Before describing the invention, the prior art thermocouple drive assembly on which the invention is an improvement will be described with reference to FIG. 1A. Reactor 11 has a thermocouple well 12 which extends into the reaction zone so that temperature can be determined at various locations in the reactor. A continuous sprocket chain 13 carries a thermocouple holder 14 up and down when driven by a motor 15 which responds to a computer input. Potentiometer 16 is connected to one of the drive sprockets and produces electrical outputs indicating the vertical position of holder 14.

The thermocouple probe head 17 is mounted on the holder 14. The thermocouple probe 18 protrudes for a length dependent upon the depth to which thermocouple probe is to be inserted into the well 12. As the holder 14 moves up and down, the thermocouple probe 18 is positioned at different vertical locations in the well 12. The problem arises because the thermocouple probe 18 must extend from head 17 for a distance of 25" or more depending upon the type of reactor in which it is installed. This long length of thermocouple probe tends to bow. Often, the bow produces binding at the opening in the well 12, thereby bending the thermocouple probe and often resulting in damage to the unit.

This problem is solved by the present invention which is shown in FIG. 1.

In accordance with the invention, drive means including an idler wheel 20 and a drive wheel 21 are positioned closely adjacent to the opening in thermocouple well 12. The assembly of the present invention includes lower guide 22 and upper guide 23 which guide thermocouple probe 24 into the opening in the thermocouple well 12. Drive wheel 21 is driven by stepping motor 25 to move the thermocouple probe 24 into and out of the well 12.

The thermocouple probe 24 is connected to the free end of supporting cable 26 from reel 27 which is spring loaded. As the stepping motor 25 moves the thermocouple probe 24 into and out of the well 12, the cable 26 is unwound or wound from or onto the reel 27.

In one form of the invention, reel 27 is a spring loaded take up drum included in a position transducer 28. As the reel rotates, transducer 28 produces a signal representing the position of the thermocouple probe in the reactor. The output of the transducer 28 is connected to an input to digital computer 29.

Thermocouple leads 30 are connected to a trolley 34 which travels with the thermocouple probe 24 and supporting cable 26. These thermocouple leads are connected to another input to digital computer 29. Digital computer processing means 29 drives the stepping motor 25 to position thermocouple probe 24 at different locations in the reactor 11 at which temperature measurements are made.

Stepping motor 25 (FIG. 4) is connected by bellows coupling 25a (FIG. 3) to the driving wheel 21. Idler wheel 20 is biased toward drive wheel 21 by the spring 32. The thermocouple probe 24 is pinched between wheels 20 and 21 and is driven up and down through the lower guide 22 and the upper guide 23.

A trolley 34 travels up and down on the guides 35 and 36. Guides 35 and 36 are mounted on a baseplate 40 by mounting brackets such as 41 and 42. A mounting bracket 43 is provided to mount the transducer assembly to baseplate 40. Lower guide 22 is closely adjacent to the opening in the thermocouple well 12 in the reactor.

Thermocouple probe 24 is attached to the trolley 34. Terminals mounted on trolley 34 provide means for connecting thermocouple leads to the thermocouple probe 24.

The reel 27 of the cable may be included in the transducer 28. In one actual embodiment of the invention, transducer 28 is a Celesco linear transducer, Part No. 101-25-A, having a 25" range. Transducer 28 indicates the extension of the free end of the cable from the transducer. The free end of cable 26 is connected to the trolley 34.

Transducer 28 has an electrical connector 39 for connecting to an input to the computer.

Thermocouple well 12 extends throughout the length of the reactor. The thermocouple drive assembly is positioned so the guide of the thermocouple assembly is closely adjacent to the opening in the thermocouple well 12. During operation of the reactor it is desirable to periodically take a series of temperature measurements at different locations. The thermocouple assembly of the present invention is well suited to do this.

In an actual embodiment of the invention, two thermocouples, one of 1/16" diameter and the other of 1/25" diameter, both about 20" in length, were used in tests over a period of several months with no thermocouple bending experience. The device is capable of measuring very high temperatures, 500° F. to 1,500° F. because metal drive wheels are used.

While a particular embodiment of the invention has been shown and described, various modifications are within the true spirit and scope of the invention. The appended claims are, therefore, intended to cover all such modifications.

What is claimed is:

1. An assembly for driving a thermocouple into a thermocouple well in a hydrocarbon reactor comprising:
   a thermocouple probe;
   drive means including two pinch wheels biased to grip said thermocouple probe between them, said drive means being adjacent said thermocouple well for driving one end of said thermocouple probe into said well;
   terminals for connecting thermocouple leads to said thermocouple probe;
   a reel of supporting cable positioned remote from said thermocouple well, a free end of the cable on said reel being connected to the other end of said thermocouple probe so that said drive means drives said one end of said thermocouple probe into and out of said well to different positions in said reactor to sense the temperature thereof as the cable on said reel is unwound and wound onto said reel;
   a transducer driven by said reel, said transducer producing an output indicating the position of said probe in said reactor;
   a stepping motor for driving said pinch wheels in controllable increments; and
   a digital computer, said thermocouple leads being connected to an input to said digital computer, the output of said transducer being connected to an input to said digital computer, and said digital computer controlling said stepping motor to record temperature measurements at precisely controlled positions in said reactor.

2. The assembly recited in claim 1 further comprising:
   a linearly moving trolley, said thermocouple probe being connected to said trolley and the free end of said supporting cable being connected to said trolley.

3. The assembly recited in claim 2 further comprising:
   two elongated guide members, said trolley being positioned to travel on said guide members.

4. An assembly for driving a thermocouple into a thermocouple well comprising:
   a thermocouple probe;
   drive means adjacent said thermocouple well for driving one end of said thermocouple probe into said well;
   terminals for connecting thermocouple leads to said thermocouple probe;
   a first tubular guide positioned adjacent to the opening of said thermocouple well, said thermocouple probe extending through said guide into said thermocouple well;
   a second tubular guide positioned on the opposite side of said drive means from the first named guide, said thermocouple probe extending through said second guide, said drive means and said first guide; and
   controllable drive means responsive to processing means for recording temperature measurements at precisely controlled position in said thermocouple well.

5. The assembly recited in claim 4, further comprising:
   a reel of supporting cable positioned remote from said thermocouple well;
   a linearly moving trolley, said thermocouple probe being connected to said trolley and the free end of said supporting cable being connected to said trolley.

6. The assembly recited in claim 5 further comprising:
   two elongated guide members, said trolley being positioned to travel on said guide members.

* * * * *